(12) United States Patent
Boser et al.

(10) Patent No.: US 9,323,397 B2
(45) Date of Patent: Apr. 26, 2016

(54) IN-AIR ULTRASONIC RANGEFINDING AND ANGLE ESTIMATION

(71) Applicant: THE REGENTS OF THE UNIVERSITY OF CALIFORNIA, Oakland, CA (US)

(72) Inventors: Bernhard E. Boser, Berkeley, CA (US); Richard J. Przybyla, Berkeley, CA (US); Andre Guedes, San Francisco, CA (US); David A. Horsley, Albany, CA (US); Stefon E. Shelton, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 113 days.

(21) Appl. No.: 14/204,917

(22) Filed: Mar. 11, 2014

(65) Prior Publication Data

US 2014/0253435 A1 Sep. 11, 2014

Related U.S. Application Data

(60) Provisional application No. 61/776,403, filed on Mar. 11, 2013.

(51) Int. Cl.
*G09G 5/00* (2006.01)
*G06F 3/043* (2006.01)

(52) U.S. Cl.
CPC ...... *G06F 3/043* (2013.01); *G06F 2203/04101* (2013.01)

(58) Field of Classification Search
CPC ...... G06F 3/043; G06F 3/0433; G06F 3/0436
See application file for complete search history.

(56) References Cited

U.S. PATENT DOCUMENTS

| | | | | |
|---|---|---|---|---|
| 2007/0288194 A1* | 12/2007 | Boillot | | G06F 3/0304 702/150 |
| 2010/0148627 A1* | 6/2010 | Funasaka | | G01H 11/08 310/316.01 |
| 2011/0198970 A1* | 8/2011 | Martin | | B81B 7/0058 310/340 |
| 2012/0001875 A1 | 1/2012 | Li et al. | | |
| 2012/0069712 A1* | 3/2012 | Potanin | | G01S 7/003 367/98 |
| 2014/0118091 A1* | 5/2014 | Burak | | H03H 9/173 333/187 |
| 2014/0198072 A1* | 7/2014 | Schuele | | G06F 3/044 345/174 |

OTHER PUBLICATIONS

Royer, M. et al., "ZnO on Si Integrated Acoustic Sensor", Sensors and Actuators, 4 (1983) 357-362.

* cited by examiner

*Primary Examiner* — Lixi C Simpson
(74) *Attorney, Agent, or Firm* — O'Banion & Ritchey LLP; John P. O'Banion

(57) ABSTRACT

An apparatus for determining location of a moveable object in relation to an input device includes an array of one or more piezoelectric micromachined ultrasonic transducer (pMUT) elements and a processor. The array is formed from a common substrate. The one or more pMUT elements include one or more transmitters and one or more receivers. The processor configured to determine a location of a moveable object in relation to an input device using sound waves that are emitted from the one or more transmitters, reflected from the moveable object, and received by the one or more receivers.

8 Claims, 4 Drawing Sheets

IN-AIR ULTRASONIC RANGEFINDING AND ANGLE ESTIMATION

CROSS-REFERENCE TO RELATED APPLICATIONS

This application claims the benefit of U.S. provisional patent application Ser. No. 61/776,403 filed on Mar. 11, 2013, incorporated herein by reference in its entirety.

STATEMENT REGARDING FEDERALLY SPONSORED

This invention was made with Government support under N66001-08-C-2023 awarded by the Defense Advanced Research Projects Agency (DARPA) and the Space and Naval Warfare Systems Command (SPAWAR). The Government has certain rights in the invention.

INCORPORATION-BY-REFERENCE OF COMPUTER PROGRAM APPENDIX

Not Applicable

BACKGROUND OF THE INVENTION

1. Field of the Invention

The present invention pertains generally to a sensor system, and more particularly to a system which can measure the range and direction to objects that are located in front of the sensor system.

2. Description of Related Art

Alternatives to the keyboard and mouse are being rapidly deployed in computers, smartphones, and tablets. The touch screen interface has gained traction in all three markets and dominates the smartphone and tablet market. The touch screen allows intuitive interfaces based on software buttons to be used and is especially ideal for small screens where the user's hand can easily traverse the entire screen. However, there are many situations where a touch screen is inappropriate or could be complemented by an interface that does not require the user to touch the screen.

Optical 3D imagers for gesture recognition suffer from large size and high power consumption. Their performance depends on ambient illumination and they generally cannot operate in sunlight. For example, the Microsoft Kinect 3D imaging system consumes 12 watts, has a volume of over 675 $cm^3$, and cannot operate in sunlight. These factors prohibit use in portable electronics.

Ultrasound transmitters and receivers have used continuous wave signals to calculate the impulse response of a channel and to extract from this the user's gestures. However, use of continuous wave signals is susceptible to multipath interference, and requires extremely high dynamic range in the receive electronics. Multipath interference arises when transmitted waves reflect off several targets and arrive back at the receiver. If the waves have a slightly different path length, they can combine destructively, thereby canceling the return signal. The high dynamic range requirement arises because the ultrasound wave is attenuated as it travels to the target and back. When the wave returns, it is many times smaller than the transmitted signal. Generally there is significant leakage from the transmitter to the receiver, so the receiver must detect the faint echo in the presence of a large feedthrough component from the transmitter. This requires large dynamic range.

For gesture input to portable devices, it is desirable to build a system that has <1 $cm^3$ size, <10 mW power consumption, and which can be used in a variety of environmental conditions. This invention provides an enabling technology to accomplish these goals.

BRIEF SUMMARY OF THE INVENTION

An aspect of the present invention is to provide a system which can measure the range and direction to objects that are located in front of the sensor system. One application is gesture control for computer interfaces. The system may comprise a gesture recognition system that can be used to track a user's hand or other parts of the body and translate the user's movements (e.g. position and motion) into input commands to the device.

By way of example, and not of limitation, the present invention uses ultrasound waves to measure the range and angle to targets. In one embodiment, an ultrasound wave is emitted from one or more ultrasound transceivers, and one or more ultrasound transceivers are used to detect the echo. Time diversity in the transmitted signal allows the time-of-flight to be calculated which is used to infer the range to the target. A spatial array of transceivers allows the direction of the returning wave to be calculated.

The use of sound to measure the depth of the surroundings is attractive because the speed of sound is roughly one million times slower than the speed of light. Therefore, for similar wavelength, resolution, and accuracy, a system can operate at a frequency ~1 million times lower than that of an optical/RF system. This allows the use of low-speed, power efficient electronics that enables the system to consume orders of magnitude less power.

Examples of potential uses for the present invention include, but are not limited to, the following:

1. Gesture Control:
    (a) When non-contact user input is required, such as in a sterile environment such as an operating room.
    (b) When gesture control is complementary to other input methods, such as a tablet which has a touch screen input as well as a gesture control input. In such a system, gestures might be used to control the macro inputs to the device, such as to advance a slide, scroll, or switch applications. The touch screen could be used for fine control, such as entering text or navigating menus.
    (c) When gesture control is the primary input method:
        (i) Display control.
        (ii) Vehicle dashboard control.
2. Environment Mapping:
    (a) For use on a robotic system or micro-air vehicle to map the environment, avoid collisions, etc.
    (b) For human monitoring e.g. to detect a driver nodding off at the wheel.
    (c) For industrial process control e.g. for tracking the location of an object without using encoders.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS

OF THE DRAWING(S)

The invention will be more fully understood by reference to the following drawings which are for illustrative purposes only:

DETAILED DESCRIPTION OF THE INVENTION

The present invention generally comprises an ultrasonic depth sensor which can be used to measure the position and configuration of a user's hand(s) with respect to an electronic device (hereafter "computer") in order for the user to generate input into the computer. The sensor may be configured to detect motions of the user's entire hand or individual fingers. The computer translates the user's motions into input commands for the computer, and may generate visual, audio, or tactile feedback to the user.

The system of the present invention differs from prior approaches in several ways. For example, the system of the present invention also uses pulse-echo excitation and closely spaced arrays of transducers, where the phase and amplitude of the transducers can be controlled to provide angular resolution.

Figure 1:
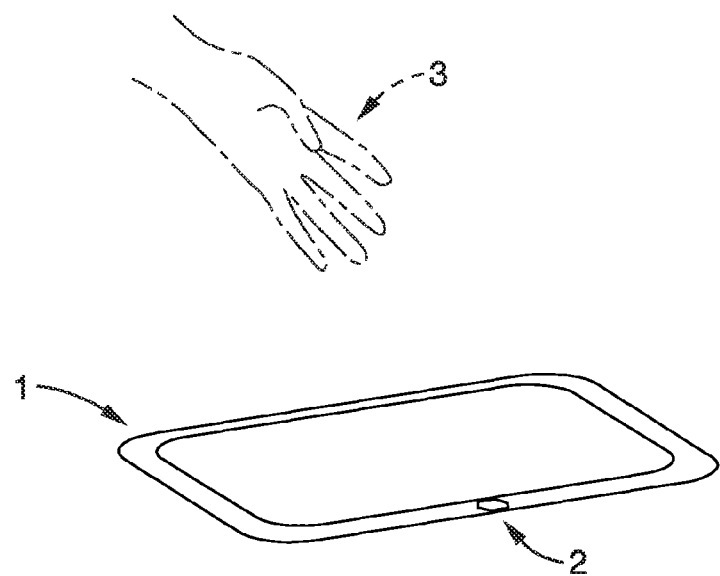
FIG. 1 is a schematic diagram of a sensor mounted on a computing device and a target such as a hand.

FIG. 1 shows an embodiment of a sensor system according to the present invention. Computer 1 has a depth sensor 2 mounted on it such that sound waves are emitted towards a user's hand 3. Depth sensor 2 transmits sound waves into the air around computer 1. Reflected sound waves from a hand 3 or another object return to depth sensor 2 and the sensor determines the location of the user's hand 3 with respect to the computer 1. Several depth sensors 2 may be used together or separately in different locations around the computer. The velocity or acceleration of the user's hand 3 can be determined by the difference in the hand's position between measurements. The position, velocity, and/or acceleration (hereafter "state") of the user's hand 3 can serve as input to the computer 1. Furthermore, the state of fingers on the hand 3 can also be measured and be used as input to the computer 1. Also, the state of a second hand and fingers on a second hand can also be determined as used as inputs to the computer 1. Finally, the state of other objects can also be used as inputs to the computer 1.

The depth sensor 2 performs a measurement as follows. Sound waves are transmitted into the air by one or more microelectromechanical transmitting elements. The transmitted signal can be either a continuous wave or a pulsed excitation. The sound signals travel into the environment and are reflected by any objects present in the environment. The reflected sound signals travel back to one or more receivers. The range R is estimated from the delay between the transmitted signal and the received signal according to the speed of sound. The direction to the target is either estimated from the delay between separate received signals according to the distance between receivers, estimated from the delay between transmitted signals according to the distance between transmitters, or estimated using a combination of both methods.

Figure 2:
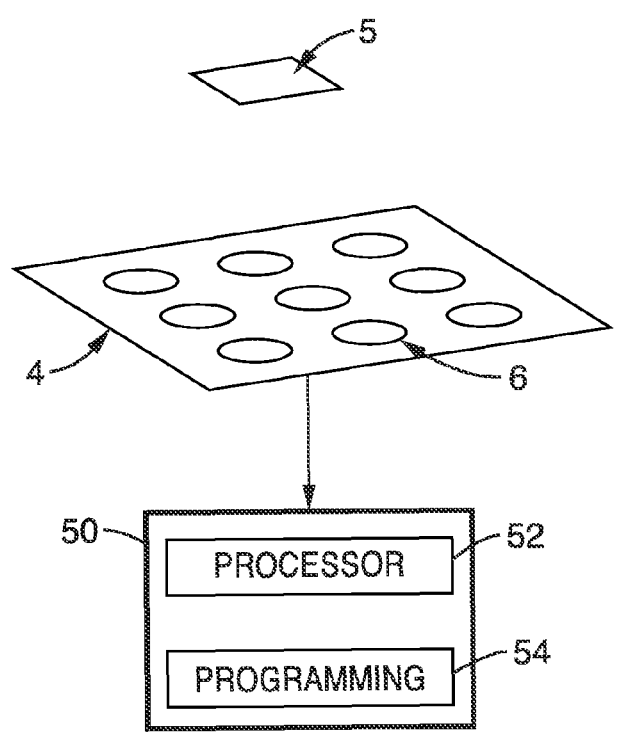
FIG. 2 is a schematic diagram of a sensor array and a target.

FIG. 2 shows an array of sound transducers with several transducer elements 6 arrayed on a sensor substrate 4. Sound from transmitting elements 6 is directed towards a target 5 and the reflected signal from this target is used to determine the position of the target. Transducer elements 6 may act as transmitters, receivers, or both. The transducers are configured to be smaller than the wavelength of the transmitted sound such that transmit and receive sensitivity is nearly isotropic. The reflected signals are received by the computer 50 having programming 54 executable on processor 52 for evaluating the received reflected signals to determine the position and/or motion (e.g. gestures) of the hand 3, as will be described in further detail below.

When transmitting a sound wave, one or more transducers may be used. If a single transducer is used, the transmitted wave is isotropic. Therefore any reflected signal may originate from objects at a wide range of angles. In this case, an array of transducers is used to receive the reflected signal, and the target locations are reconstructed by measuring the time delay between the transmitted signal and the received signal as well as the time delay between the several receive signals and the relative location of the receive elements.

If multiple transducers are used to transmit sound waves, a narrow beam is emitted. The direction of this beam can be controlled using phased array techniques. In this mode, each transmitter is individually addressed with an electrical signal in order to control the direction of the emitted beam. A single receiver may be used to measure the sound wave returning from the direction of the emitted beam, or multiple receivers may be used in conjunction with multiple transmitters in order to increase the received signal level and the performance of the system.

If several receivers are used, the received signal level is maximized when the returning signals are added together in a coherent fashion. However, if the returning signals are coming from an object which is at a direction that is not normal to the transducer substrate, they are shifted in time when they arrive at the receive transducers. Therefore the receiver will ideally introduce a corresponding delay to each receive signal in order to maximize the signal level.

In the range axis, range accuracy, range resolution, and the maximum and minimum operating range are important performance metrics. To minimize range resolution and the minimum operating range and maximize range accuracy, the bandwidth of the transmitted and received signals may be maximized.

In the angle axis, angular accuracy and angular resolution are the important performance metrics. To minimize angular resolution and maximize angular accuracy, the ratio of the transmitted and received signals may be maximized.

Several transmitter and/or receiver transducers may created on a single substrate. In a preferred sensor configuration 30 shown in FIG. 3A, each transducer comprises of a thin membrane 8 that is much thinner than the substrate 7 supporting it. The membrane 8 can be actuated using piezoelectric transduction, capacitive transduction, thermal actuation, or the like. Actuation causes the membrane 8 to deflect out of the plane of the substrate 7, generating a sound wave. The transducer membrane 8 is actuated at its lowest frequency resonance.

Figure 3A:
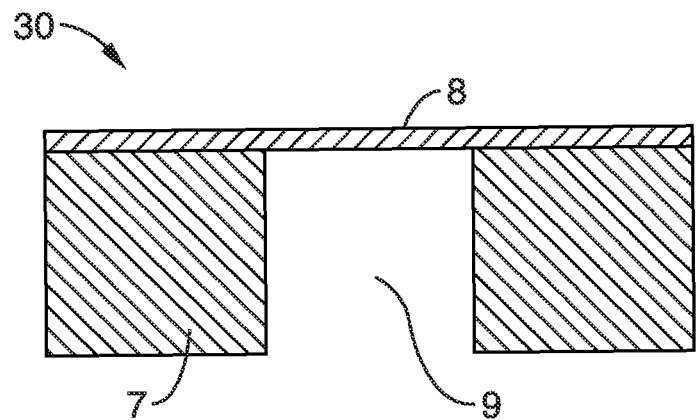
FIG. 3A is a cross-section of a single transducer.

As shown in FIG. 3A, substrate 7 supports membrane 8. The membrane 8 can be released using a tube 9 through the substrate 7. The substrate 7 may be configured to be approximately an odd multiple of a quarter wavelength of the sound signal, which is the speed of sound divided by the center of the operating frequency band ($\lambda=c/f$). If the substrate meets this condition, the tube 9 on the substrate side of the membrane 8 (hereafter 'back side') acts as a resonant cavity. This has the effect of increasing the signal level emitted and received by the membrane 8 on the back side. It also increases the effective damping of the membrane, which increases the bandwidth of the transducer. Furthermore, the use of an etch through the substrate allows the back side of the substrate 7 to be facing the air. This serves to protect the thin membrane from physical damage.

The specific equation that should be used to choose the thickness of the substrate to maximize the effect of the resonant cavity is $$\frac{n\lambda}{4} = L + 0.48\sqrt{A},$$

where $\lambda$ is the wavelength of the sound wave, L is the thickness of the substrate, A is the cross-sectional area of the tube, and n is the odd series n=1, 3, 5 . . . . This equation is applicable when $\lambda$ is larger than $\sqrt{A/\pi}$.

Figure 3B:
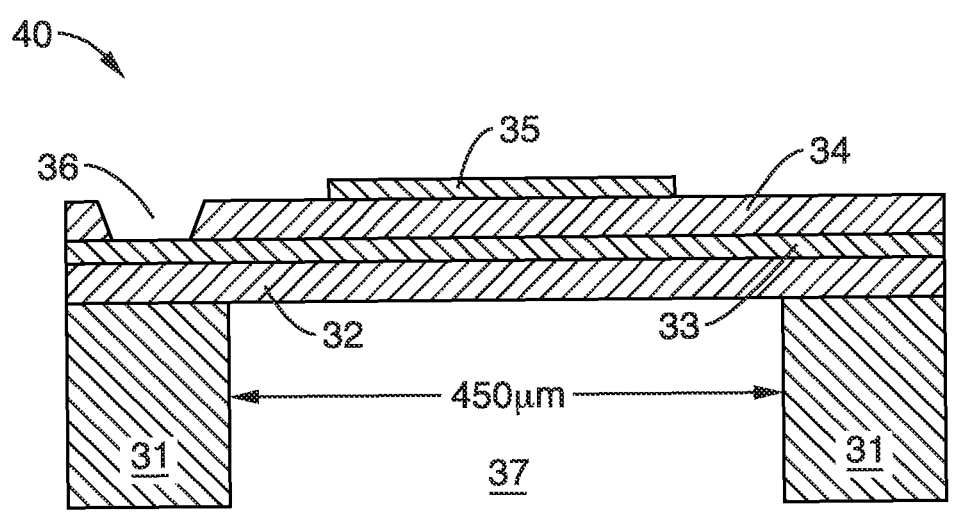
FIG. 3B is a cross-section of a multi-layer, micro-machined transducer.

FIG. 3B shows an embodiment of a piezoelectric Micromachined Ultrasonic transducer (pMUT) according to the present invention. The transducer 40 comprises an AlN/Mo/AlN/Al stack fabricated on a silicon wafer 31 and released with a backside through-silicon etch. In a one embodiment, the AlN/Mo/AlN/Al stack is approximately 2 μm thick. In this embodiment, the ultrasound transducer 40 may be in the form of a circular piezoelectric unimorph membrane. Specifically, a bottom layer 32 is provided over a substrate 31. The bottom layer 32 may act as a passive bending layer to facilitate out of plane movement, or act as a second piezoelectric layer. By way of example, but not of limitation, the bottom layer 32 may be made from aluminum nitride (AlN), lead zirconium titanate (PZT), zinc oxide (ZnO), silicon, silicon dioxide, polysilicon, or the like. A bottom metal layer 33 is disposed over the bottom layer 32. In one example, the bottom metal layer 33 may be a layer of molybdenum, aluminum or platinum. A piezoelectric layer 34 is sandwiched between the bottom metal layer 33 and the top metal layer 35. The layer 34 may be made of AlN, PZT, ZnO or other piezoelectric. In one example, the top metal layer 35 may be made of aluminum, gold (AU), or other metal or combination of metals. The transducer 40 may include an etch hole 36 that exposes the bottom metal layer 33. In one example, the etch hole 36 may be formed by wet or dry etch process. In addition, a resonant tube 37 is formed to define a transducer membrane by deep reactive ion etch on the substrate 31.

Voltage applied across the electrodes results an in-plane stress in the top AlN layer 34 via the inverse piezoelectric effect. The bottom layer of AlN 32 causes a stress gradient to form across the membrane which results in out-of-plane displacement, causing the transducer to emit a pressure wave. Similarly, an incident pressure wave causes in-plane stress in the top layer of AlN 34, which results in charge developing across the electrodes that can be sensed electrically.

The 450 μm diameter transducers are designed to have a resonant frequency $f_o \approx 190$ kHz. At atmospheric pressure, the Q of the transducer is about 15, corresponding to a bandwidth BW=$f_o/2Q \approx 6.2$ kHz, and the motional impedance of each device is approximately 2 MΩ at resonance. The effective surface area of each transducer is SA=0.05 mm². The capacitance of these devices, including bond pads and interconnect, is approximately 8 pF.

Figure 4:
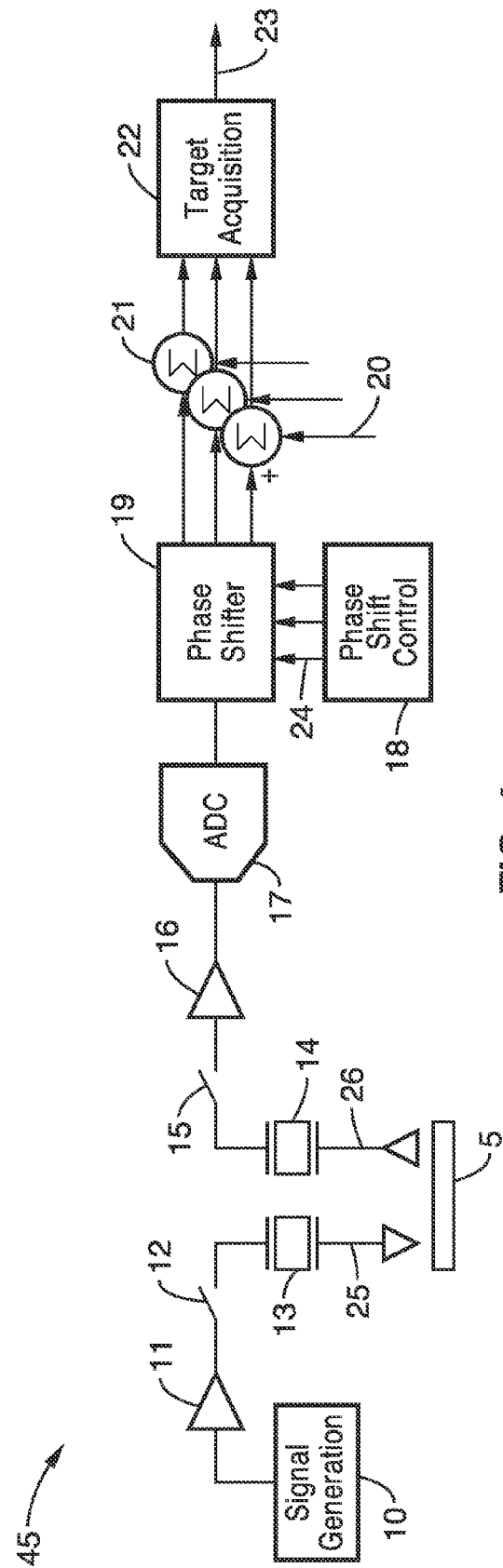
FIG. 4 is a circuit schematic showing a possible embodiment of the sensor system in accordance with the present invention.

FIG. 4 shows a schematic diagram of a single channel sensor system 45 according to one embodiment of the current invention. In FIG. 4, a measurement cycle begins when signal generation circuit 10 generates a transmit pulse 25. The transmitting circuit 11 is designed to excite a transducer 13 with a voltage signal near the resonance of the transducer 13. The transmitting circuit 11 may include a circuit (not shown) to determine the resonant frequency of the transducer 13. A switch 12 provides isolation between the transmitter 11 and the transducer 13 during the time when transducer 13 is not used for transmitting. The transmitted signal 25 passes out into the air and may reflect off one or more targets 5 if they are present. The transmitter 13 stops transmitting and switch 12 is opened.

Subsequently, switch 15 is closed and the receiving transducer 14 begins receiving. The received echo 26 arrives at transducer 14 after a delay according to the range to the reflecting surface 5. Amplifier 16 amplifies and filters the signal which comprises noise plus any received echo signal 26. Analog to digital converter 17 (hereafter "ADC") converts the analog received signal to a digital form and filters the signal further. Phase shifter 19 is controlled by phase shift controller 18 to delay the signals from ADC 17 by several different amounts according to delay vector 24. Signals acquired by other transducers (hereafter 'other channels') 20 that have gone through the processing steps described up to here are added to the signals from phase shifter 19 by adders 21 and sent to a target acquisition system 22, which then outputs target acquisition data 23.

Each of the delays in delay vector 24 are designed to delay the signal from the ADC 17 by an amount corresponding to a direction in space, and according to the transducer element 14 location on the sensor assembly. Each delay in delay vector 24 corresponds to a different direction in space. The range of angles corresponding to delay vector 24 form the measurement field of view, and each signal leaving adder 21 is an intensity vs. range measurement (hereafter "A-scan") for a specific direction of view. If the transmit signal is isotropic, the entire field of view can be captured with a single measurement cycle, and the desired field of view and angular resolution determines the size of delay vector 24, the number of adder blocks 21, and the number of signals processed by target acquisition block 22.

Switch 15 and switch 12 together allow transducer 14 and transducer 13 to be the same device (e.g. a transceiver), which is used both to transmit and receive at separate times. When transmitting, switch 12 is closed and switch 15 is open. When receiving, switch 12 is open and switch 15 is closed. A single transducer may also be used to transmit and receive simultaneously. In this case switch 12 and switch 15 are closed.

Target acquisition block 22 thresholds the A-scan signals to determine which signals contain echoes. The signals which contain echoes are processed to determine the range and direction to the targets 5. The range to each target 5 is measured by determining the delay between the transmit pulse 25 and the time when an echo 26 has reached half of its maximum amplitude, and using the fact that the range is half the measured time times the speed of sound. The direction to each target 5 is coarsely determined by finding the maximum of the A-scan measurements, and using the direction represented by that A-scan measurement as the direction to the target 5. A more accurate estimation can be made by comparing the phase of each received echo signal at the output of the ADC 17 to a reference clock. Phase differences between channels are used to determine the direction to each target 5.

The transducer 14 continues to receive data until the elapsed time since the transmit pulse 25 began exceeds the twice the maximum desired range of the system divided by the speed of sound. A new measurement cycle can begin at any following time.

Figure 5:
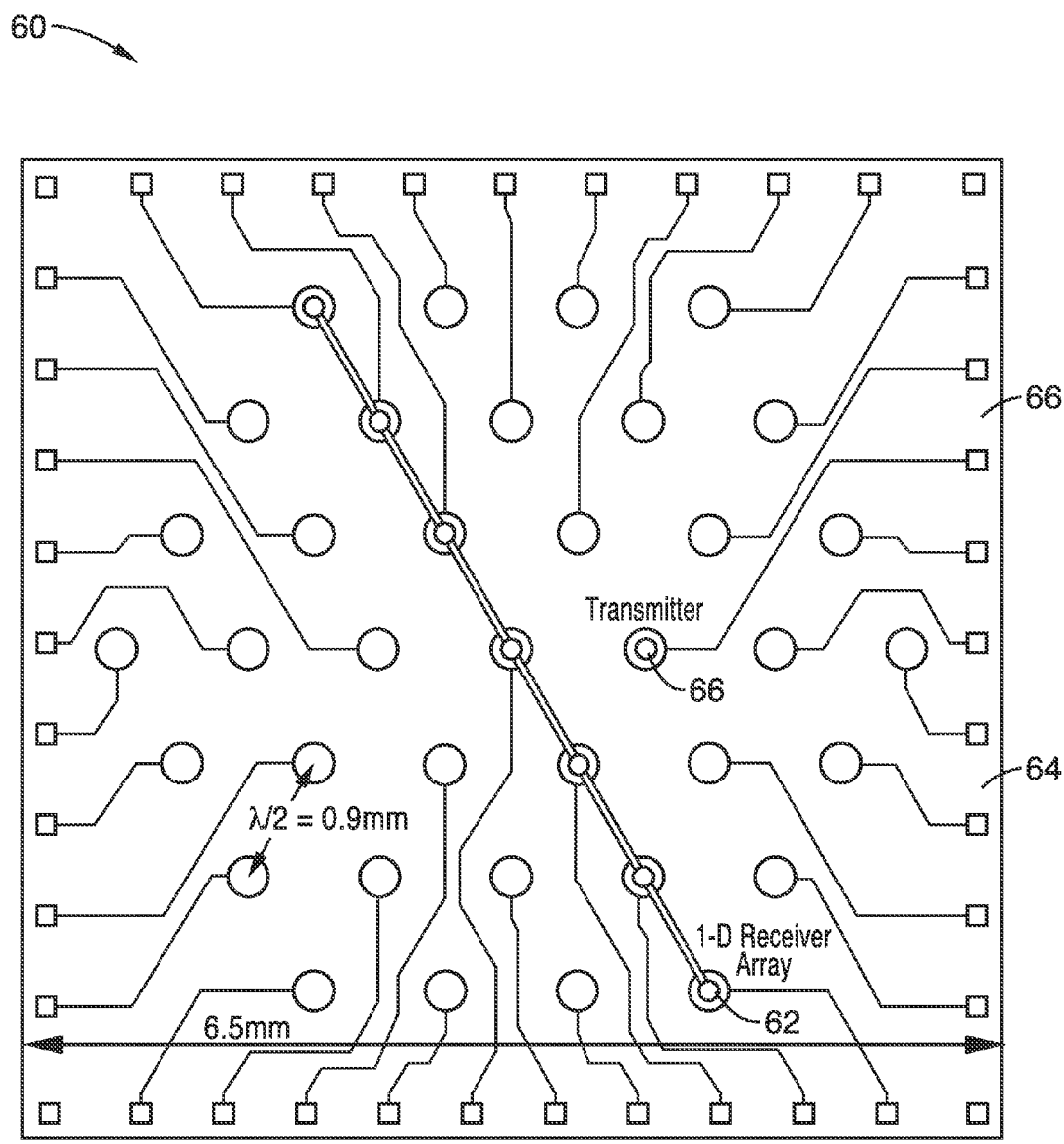
FIG. 5 is a micrograph of a seven element linear array of transducers in accordance with the present invention.

FIG. 5 shows an example of a wafer configuration 60 for a spatial array of transceivers. Specifically, FIG. 5 shows a micrograph of a seven element linear array 62 used to receive echoes from the environment. To protect the transducer membranes from damage, the backside of the die 64 is exposed to the air. The transmitter 66 is excited with a $T_p$=160 µsec burst at $f_o$ and emits an omnidirectional beam. A transmit signal twice as long as required by the bandwidth of the transducer is used to allow more accurate measurement of the phase of the return echo. This increases the range resolution from 21 mm to 34 mm. The transmitter power consumption, based on $CV^2f$ losses, is 50 µW. The 1D receiver array 66 captures the echoes which are amplified, digitized, and quadrature downconverted for each channel separately. Digital filtering removes wideband electronic noise. Object positions can be calculated by a real-time digital post-processor. For each angle θ, the signals from each channel k are shifted by a phase shift $k\phi=k2\pi d/\lambda \sin(\theta)$ and summed with the other channels. The angle is swept over the entire angle range. Approximate target ranges and angles can be extracted from this data. Subsequently, a fine estimator improves the estimate by searching each baseband signal for a pulse in temporal proximity to the coarse estimate. Refined estimates for the range and angle to the target are determined from the average time-of-flight for each channel's echo and the phase difference between adjacent receive channels.

Additional description can be found in R. J. Przybyla et al., "In-air ultrasonic range finding and angle estimation using an array of AlN micromachined transducers," in Proc. Hilton Head Solid-State Sensors, Actuators and Microsystems Workshop 2012, 3-7 Jun. 2012, pp. 50-53, the entire disclosures of which are incorporated by reference herein.

From the description herein it will be appreciated that the invention can be embodied in various ways which include, but are not limited to:

1. An apparatus for determining location of a moveable object in relation to a computer input device, the apparatus comprising: a depth sensor; said depth sensor comprising an ultrasound emitter; said depth sensor comprising an ultrasound receiver; and means for determining location of a moveable object in relation to a computer input device using sound waves that are emitted from the ultrasound emitter, reflected from the moveable object, and received by said ultrasound receiver.

2. An apparatus for determining location of a moveable object in relation to a computer input device, the apparatus comprising: a depth sensor; said depth sensor comprising an ultrasound emitter; said depth sensor comprising an ultrasound receiver; and means for determining location of a moveable object in relation to a computer input device using sound waves that are emitted from the ultrasound emitter, reflected from the moveable object, and received by said ultrasound receiver; wherein said means for determining location of a moveable object in relation to a computer input device comprises a processor and programming executable on the processor and configured for performing steps comprising: transmitting sound waves from said ultrasound emitter; wherein said sound waves are continuous or pulsed; receiving sound waves reflected from the moveable object; calculating delay between transmitted and received sound waves; estimating a range R from said delay based on the speed of sound; estimating direction to the moveable object in relation to the depth sensor based on delay between separate received signals and distance between multiple ultrasound receivers, or based on delay between transmitted signals and distance between multiple transmitters, or a combination thereof.

3. The apparatus recited in any preceding embodiment: wherein the depth sensor is an element of an array of depth sensors; and wherein the array comprises a plurality of depth sensors on a substrate.

4. The apparatus recited in any preceding embodiment, wherein the depth sensors are smaller in size than the wavelength of sound emitters by the depth sensors such that transmit and receive sensitivity is substantially isotropic.

5. An apparatus for determining location of a moveable object in relation to a computer input device, the apparatus comprising: a depth sensor; said depth sensor comprising an ultrasound emitter; said depth sensor comprising an ultrasound receiver; and means for determining location of a moveable object in relation to a computer input device using sound waves that are emitted from the ultrasound emitter, reflected from the moveable object, and received by said ultrasound receiver; wherein said means for determining location of a moveable object in relation to a computer input device comprises: a signal generation circuit configured for generating a transmit pulse; a transmitting circuit configured to excite the ultrasound emitter with a voltage signal near the resonance of the ultrasound emitter; a first switch configured for providing switchable isolation between the transmitter circuit and the ultrasound emitter during a time when the ultrasound emitter is not used for transmitting; a second switch configured for providing switchable isolation of the ultrasound receiver during a time when the ultrasound is not used for receiving; an amplifier coupled to said ultrasound receiver through said second switch, said amplifier configured for amplifying and filtering a received signal, said received signal comprising noise plus any analog received echo signal; an analog to digital converter (ADC) configured to convert the analog received signal to a digital form and filter the signal; a phase shifter and phase shifter controller configured to delay signals from the ADC by a plurality of different amounts according to a delay vector; a plurality of adders configures to add multiple signals from the phase shifter; a target acquisition system configured for processing the signals from the phase shifter and generate a useable output for controlling the computer.

6. The apparatus recited in an preceding embodiment, wherein each of the delays in the delay vector configures to delay the signal from the ADC by an amount corresponding to a direction in space, and according to the ultrasound receiver location.

7. The apparatus recited in any preceding embodiment, wherein each delay in delay vector 24 corresponds to a different direction in space.

8. The apparatus recited in any preceding embodiment: wherein a range of angles corresponding to the delay vector form a measurement field of view; and wherein each signal leaving the adder is an intensity vs. range measurement (A-scan) for a specific direction of view.

9. The apparatus recited in any preceding embodiment, wherein if the transmit signal is isotropic, the entire field of view can be captured with a single measurement cycle, and the desired field of view and angular resolution determines the size of the delay vector, the number of adders, and the number of signals processed by the target acquisition system.

10. The apparatus recited in any preceding embodiment, wherein the target acquisition system is configured to threshold the A-scan signals to determine which signals contain echoes.

11. The apparatus recited in any preceding embodiment, wherein the signals which contain echoes are processed to determine the range and direction to the targets.

12. The apparatus recited in any preceding embodiment, wherein range to each target is measured by determining the delay between the transmit pulse and the time when an echo has reached half of its maximum amplitude, and using the fact that the range is half the measured time times the speed of sound.

13. The apparatus recited in any preceding embodiment, wherein direction to each moveable object is coarsely determined by finding the maximum of the A-scan measurements, and using the direction represented by that A-scan measurement as the direction to the target.

14. The apparatus recited in any preceding embodiment: wherein the phase of each received echo signal at the output of the ADC is compared to a reference clock; and wherein phase differences between channels are used to determine the direction to each moveable object.

15. An apparatus for determining location of a moveable object in relation to an input device, the apparatus comprising: an array of one or more piezoelectric micromachined ultrasonic transducer (pMUT) elements formed from a common substrate, the one or more pMUT elements comprising one or more transmitters and one or more receivers; and a processor configured to determine a location of a moveable object in relation to an input device using sound waves that are emitted from the one or more transmitters, reflected from the moveable object, and received by the one or more receivers.

16. The apparatus of any preceding embodiment: wherein the one or more transmitters transmit first sound signals and the one or more receivers receive second sound signals reflected from an movable object; and wherein the processor is configured to calculate the delay between the first and the second sound signals, estimate a range R from the delay based on a speed of sound, estimate a direction of the moveable object in relation to the input device based on the delay between the second sound signals received by the one or more receivers and a distance between the one or more receivers, or based on a delay between the first sound signals transmitted by the one or more transmitters and a distance between the one or more transmitters, or based on a combination thereof.

17. The apparatus of any preceding embodiment, wherein the one or more pMUT elements are smaller in size than the wavelengths of the first sound signals such that transmit and receive sensitivity of each element is substantially omnidirectional.

18. The apparatus of any preceding embodiment: wherein the one or more pMUT elements include a membrane provided over the substrate; wherein the membrane is thinner than the substrate in thickness; and wherein the substrate is etched through to form a cavity under portions of the membrane.

19. The apparatus of any preceding embodiment, wherein a thickness of the substrate is configured to maximize an effect of the cavity as a resonant cavity.

20. The apparatus of any preceding embodiment, wherein a back side of the substrate opposite the membrane is exposed to air.

21. The apparatus of any preceding embodiment: wherein the membrane includes a first metal layer sandwiched between a first piezoelectric layer and a second layer; and wherein the first metal layer, first piezoelectric layer, and second layer are configured to form a stress gradient across the membrane which results in an out-of-plane displacement, causing the pMUT element to emit a pressure wave.

22. The apparatus of any preceding embodiment, wherein the first piezoelectric layer is made of aluminum nitride.

23. The apparatus of any preceding embodiment, wherein the second layer is made of aluminum nitride.

24. The apparatus of any preceding embodiment, wherein the first metal layer is made of molybdenum.

25. An apparatus for determining location of a moveable object in relation to an input device, the apparatus comprising: an array of one or more piezoelectric micromachined ultrasonic transducer (pMUT) elements formed from a substrate, the one or more pMUT elements comprising one or more transmitters and one or more receivers; and a processor configured to determine a location of a moveable object in relation to an input device using sound waves that are emitted from the one or more transmitters, reflected from the moveable object, and received by the one or more receivers; wherein a transmitter circuit coupled to one or more transmitters is configured to excite the one or more transmitters with a voltage signal near a resonance of the one or more transmitters; wherein one or more amplifiers are coupled to the one or more receivers respectively, each of the one or more amplifiers configured to generate a received analog signal, the received analog signal comprising noises plus an analog echo signal; wherein one or more analog to digital converters coupled to the one or more amplifiers respectively, each of the one or more analog to digital converters configured to convert the received analog signal and generate a digital signal; wherein a phase shifter controller is configured to control one or more phase shifters coupled to the one or more analog to digital converters respectively, each of the one or more phase shifters configured to delay a corresponding digital signal by a plurality of different amounts according to a delay vector; wherein one or more adders coupled to the one or more phase shifters respectively are configured to add delayed digital signals from the one or more phase shifters; and wherein a target acquisition system coupled to the one or more adders is configured to process A-scan signals from the one or more adders and generate an output for controlling the input device.

26. The apparatus of any preceding embodiment, wherein the transmitter circuit is coupled to one or more transmitters through a first switch, the first switch configured to control connection between the transmitter circuit and the one or more transmitters.

27. The apparatus of any preceding embodiment, wherein the one or more amplifiers are coupled to the one or more receivers respectively through corresponding second switches, each of the second switches configured to control connection between the corresponding amplifier and the receiver.

28. The apparatus of any preceding embodiment, wherein each of the one or more phase shifters is configured to delay a corresponding digital signal by a plurality of different amounts corresponding to a direction in space, and according to locations of the one or more receivers.

29. The apparatus of any preceding embodiment, wherein the target acquisition system is configured to threshold the A-scan signals to determine which signals contain echoes.

30. The apparatus of any preceding embodiment, wherein the signals which contain echoes are processed to determine a range and direction of the movable object in relation to the input device.

31. A method for determining location of a moveable object in relation to an input device, the method comprising: transmitting a first sound signal from an array of one or more transceivers;

receiving a second sound signal reflected from a movable object in proximity to the array; and determining a location of a moveable object in relation to an input device as a function of the second sound signal.

32. The method of any preceding embodiment, wherein determining a location of a moveable object in relation to an input device further comprises: calculating a delay between the first and the second sound signals; estimating a range R from the delay based on a speed of sound; and estimating a direction of the moveable object in relation to the input device.

33. The method of any preceding embodiment, wherein estimating a direction of the moveable object in relation to the input device is a function of one or more of: a delay between the second sound signals received by the one or more transceivers and a distance between the one or more transceivers, or a delay between the first sound signals transmitted by the one or more transceivers and a distance between the one or more transceivers.

34. An apparatus for determining location of a moveable object in relation to an input device, the apparatus comprising: an array of one or more piezoelectric micromachined ultrasonic transducer (pMUT) elements formed from a common substrate, the one or more pMUT elements comprising one or more transceivers; a processor; and programming executable on the processor to determine a location of a moveable object in relation to an input device using sound waves that are emitted from the one or more transceivers, reflected from the moveable object, and received by the one or more transceivers.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

Although the description herein contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." Any element in a claim that does not explicitly state "means for" performing a specified function, is not to be interpreted as a "means" or "step" clause as specified in 35 USC §112, sixth paragraph. In particular, the use of "step of" in the claims herein is not intended to invoke the provisions of 35 USC §112, sixth paragraph.

What is claimed is:

1. An apparatus for determining location of a moveable object in relation to an input device, the apparatus comprising:
    an array of one or more piezoelectric micromachined ultrasonic transducer (pMUT) elements formed from a substrate, the one or more pMUT elements comprising one or more transmitters and one or more receivers; and
    a processor configured to determine a location of a moveable object in relation to an input device using sound waves that are emitted from the one or more transmitters, reflected from the moveable object, and received by the one or more receivers;
    wherein a transmitter circuit coupled to one or more transmitters is configured to excite the one or more transmitters with a voltage signal near a resonance of the one or more transmitters;
    wherein one or more amplifiers are coupled to the one or more receivers respectively, each of the one or more amplifiers configured to generate a received analog signal, the received analog signal comprising noises plus an analog echo signal;
    wherein one or more analog to digital converters coupled to the one or more amplifiers respectively, each of the one or more analog to digital converters configured to convert the received analog signal and generate a digital signal;

wherein a phase shifter controller is configured to control one or more phase shifters coupled to the one or more analog to digital converters respectively, each of the one or more phase shifters configured to delay a corresponding digital signal by a plurality of different amounts according to a delay vector;

wherein one or more adders coupled to the one or more phase shifters respectively are configured to add delayed digital signals from the one or more phase shifters; and wherein a target acquisition system coupled to the one or more adders is configured to process A-scan signals from the one or more adders and generate an output for controlling the input device.

2. The apparatus of claim 1, wherein the transmitter circuit is coupled to one or more transmitters through a first switch, the first switch configured to control connection between the transmitter circuit and the one or more transmitters.

3. The apparatus of claim 1, wherein the one or more amplifiers are coupled to the one or more receivers respectively through corresponding second switches, each of the second switches configured to control connection between the corresponding amplifier and the receiver.

4. The apparatus of claim 1, wherein each of the one or more phase shifters is configured to delay a corresponding digital signal by a plurality of different amounts corresponding to a direction in space, and according to locations of the one or more receivers.

5. The apparatus of claim 1, wherein the target acquisition system is configured to threshold the A-scan signals to determine which signals contain echoes.

6. The apparatus of claim 5, wherein the signals which contain echoes are processed to determine a range and direction of the movable object in relation to the input device.

7. An apparatus for determining location of a moveable object in relation to an input device, the apparatus comprising:

an array of one or more piezoelectric micromachined ultrasonic transducer (pMUT) elements formed from a substrate, the one or more pMUT elements comprising one or more transmitters and one or more receivers; and a processor configured to determine a location of a moveable object in relation to an input device using sound waves that are emitted from the one or more transmitters, reflected from the moveable object, and received by the one or more receivers;

wherein a transmitter circuit coupled to one or more transmitters is configured to excite the one or more transmitters with a voltage signal near a resonance of the one or more transmitters;

wherein one or more amplifiers are coupled to the one or more receivers respectively, each of the one or more amplifiers configured to generate a received analog signal;

wherein one or more analog to digital converters coupled to the one or more amplifiers respectively, each of the one or more analog to digital converters configured to convert the received analog signal and generate a digital signal;

wherein a phase shifter controller is configured to control one or more phase shifters coupled to the one or more analog to digital converters respectively, each of the one or more phase shifters configured to delay a corresponding digital signal by a plurality of different amounts according to a delay vector; and wherein one or more adders coupled to the one or more phase shifters respectively are configured to add delayed digital signals from the one or more phase shifters.

8. The apparatus of claim 7, wherein a target acquisition system coupled to the one or more adders is configured to process A-scan signals from the one or more adders and generate an output for controlling the input device.

* * * * *